United States Patent
Ponnuru et al.

(10) Patent No.: US 11,954,207 B2
(45) Date of Patent: Apr. 9, 2024

(54) PROXY AUTHENTICATION FOR RESOURCE-CONSTRAINED DEVICE

(71) Applicant: Dell Products L.P., Round Rock, TX (US)

(72) Inventors: Viswanath Ponnuru, Bangalore (IN); Chandrashekar Nelogal, Round Rock, TX (US); Chandrasekhar Mugunda, Austin, TX (US); Dharma Bhushan Ramaiah, Bangalore (IN); Shinose Abdul Rahiman, Bangalore (IN); Vineeth Radharisknan, Palakkad (IN); Rama Rao Bisa, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 384 days.

(21) Appl. No.: 17/477,622

(22) Filed: Sep. 17, 2021

(65) Prior Publication Data

US 2023/0087829 A1  Mar. 23, 2023

(51) Int. Cl.
*G06F 21/00* (2013.01)
*G06F 21/44* (2013.01)
(Continued)

(52) U.S. Cl.
CPC ............ *G06F 21/575* (2013.01); *G06F 21/44* (2013.01); *G06F 21/602* (2013.01);
(Continued)

(58) Field of Classification Search
CPC ...... G06F 21/575; G06F 21/44; G06F 21/602; G06F 21/606; G06F 21/64;
(Continued)

(56) References Cited

U.S. PATENT DOCUMENTS

2014/0108791 A1* 4/2014 Sinclair .................... G09C 1/00
                                                      713/164
2017/0272415 A1* 9/2017 Zhao ................... H04L 63/0807
(Continued)

FOREIGN PATENT DOCUMENTS

WO   WO-2008054375 A2 * 5/2008 ........... H04L 63/083

OTHER PUBLICATIONS

Lin et al., "Local Authentication and Access Control Scheme in M2M Communications With Computation Offloading", IEEE Internet of Things Journal, vol. 5, No. 4, Aug. 2018.*

*Primary Examiner* — Morshed Mehedi
(74) *Attorney, Agent, or Firm* — Larson Newman, LLP

(57) ABSTRACT

A system and method are disclosed for delegating, by a resource-constrained device, a privilege to a basic input/output system, wherein the privilege allows the basic input/output system to authenticate an endpoint device on behalf of the resource-constrained device. The system and method also includes generating an asymmetric security key that includes a private key and a public key and transmitting the public key to the basic input/output system, wherein the public key is included in a proxy certificate generated by the basic input/output system. In addition, the system and method includes establishing a secure session between the basic input/output system and the endpoint device using the private key and the proxy certificate, wherein the secure session is used by the basic input/output system to authenticate and verify that the endpoint device is authorized to perform an operation.

20 Claims, 4 Drawing Sheets

(51) Int. Cl.
  *G06F 21/57*  (2013.01)
  *G06F 21/60*  (2013.01)
  *G06F 21/64*  (2013.01)

(52) U.S. Cl.
  CPC ............ G06F 21/606 (2013.01); G06F 21/64 (2013.01); *G06F 2221/2113* (2013.01); *G06F 2221/2137* (2013.01); *G06F 2221/2141* (2013.01)

(58) Field of Classification Search
  CPC ..... G06F 2221/2113; G06F 2221/2137; G06F 2221/2141; G06F 21/6218
  See application file for complete search history.

(56) References Cited

U.S. PATENT DOCUMENTS

| | | | |
|---|---|---|---|
| 2017/0310647 A1* | 10/2017 | Hu | G06F 21/33 |
| 2018/0341773 A1 | 11/2018 | Khatri et al. | |
| 2019/0140849 A1* | 5/2019 | Kravitz | H04L 9/3236 |
| 2020/0320226 A1 | 10/2020 | Gupta et al. | |
| 2021/0067323 A1 | 3/2021 | Dambal et al. | |

* cited by examiner

PROXY AUTHENTICATION FOR RESOURCE-CONSTRAINED DEVICE

FIELD OF THE DISCLOSURE

The present disclosure generally relates to information handling systems, and more particularly relates to proxy authentication for resource-constrained devices.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A system and method are disclosed for delegating, by a resource-constrained device, a privilege to a basic input/output system, wherein the privilege allows the basic input/output system to authenticate an endpoint device on behalf of the resource-constrained device. The system and method also includes generating an asymmetric security key that includes a private key and a public key and transmitting the public key to the basic input/output system, wherein the public key is included in a proxy certificate generated by the basic input/output system. In addition, the system and method includes establishing a secure session between the basic input/output system and the endpoint device using the private key and the proxy certificate, wherein the secure session is used by the basic input/output system to authenticate and verify that the endpoint device is authorized to perform an operation.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
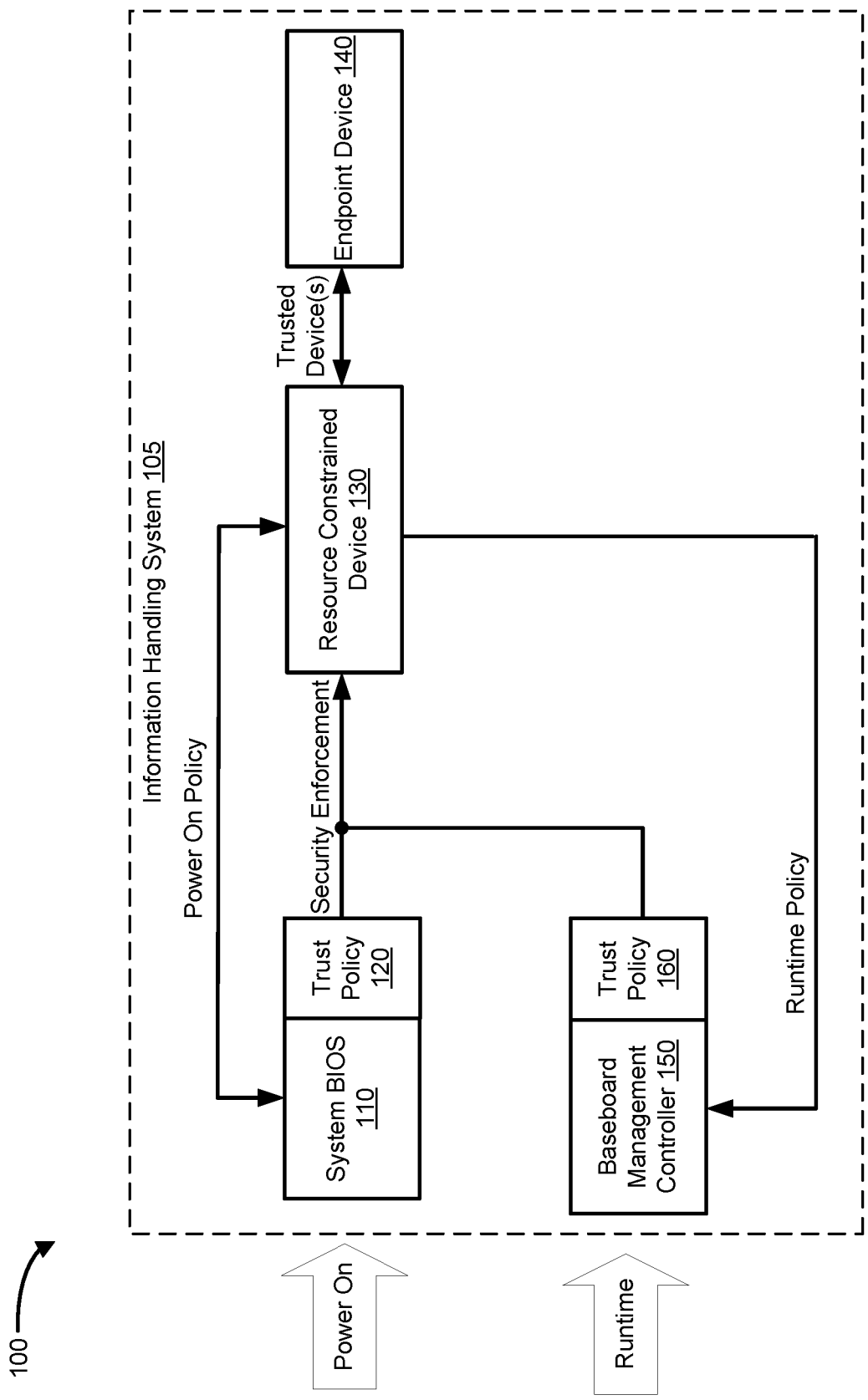
FIG. 1 is a block diagram illustrating system with proxy authentication for resource-constrained devices according to an embodiment of the present disclosure.

FIG. 1 shows a system 100 which includes a typical example of a computing environment with a resource-constrained device, wherein system 100 is configured for proxy authentication for the resource-constrained device. Information handling system 105, which is similar to information handling system 400 of FIG. 4, includes a system basic input and output system (BIOS) 110, a baseboard management controller (BMC) 150, a resource-constrained device 130, and an endpoint device 140. Endpoint device 140 may be one of the various device types such as Peripheral Component Interconnect-Express (PCIe) adapters, storage devices, Universal Serial Bus (USB) devices, etc. System BIOS 110, which is similar to BIOS/EFI module 442, is associated with a trust policy 120 while BMC 150 is associated with a trust policy 160. Trust policy 120 and trust policy 160 may each be a security protocol and data model (SPDM) trust policy which is a certificate based authentication and root of trust measurements for firmware integrity checks.

When information handling system 105 is powered on or "booted," system BIOS 110 ensures that all components are functional and subsequently load the operating system. During the boot process, system BIOS 110 may enforce a power-on policy that includes a list of criteria for a successful boot. If the power-on policy is satisfied, then the system BIOS 110 may continue and finish the boot process. Otherwise, an error may be generated, and/or the boot process may be halted.

Figure 4:
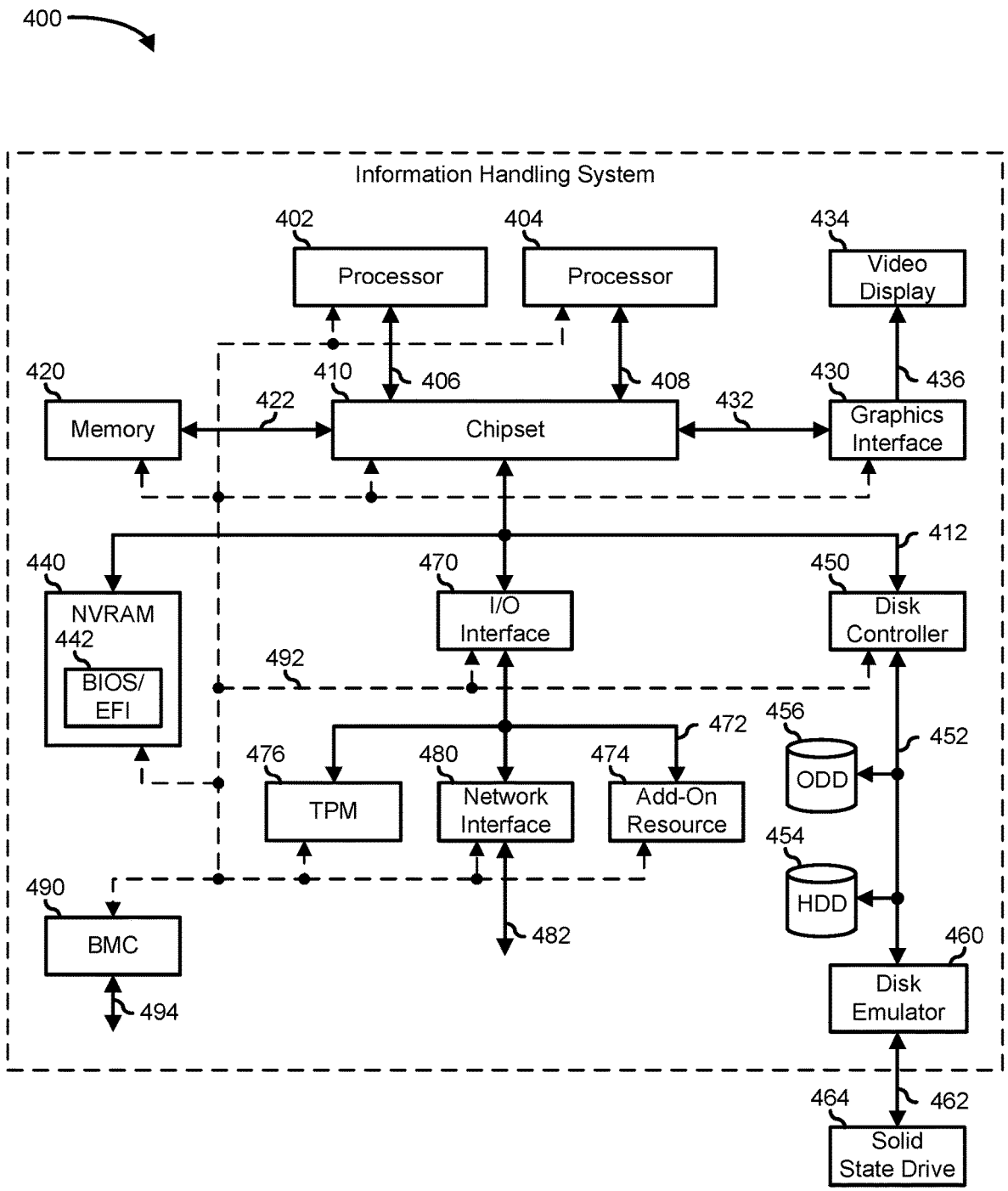
FIG. 4 is a block diagram illustrating an information handling system according to an embodiment of the present disclosure.

BMC 150, which is similar to BMC 490 of FIG. 4, may include any system, device, or apparatus configured to facilitate management and/or control of information handling system 105 and/or one or more of its components. BMC 150 may be configured to issue a command and/or other signals to manage and/or control information handling system 105 and/or its components. BMC 150 may include a microprocessor, microcontroller, digital signal processor (DSP), application-specific integrated circuit (ASIC), field-programmable gate array (FPGA), electrically erasable programmable read-only memory (EEPROM), or any combination thereof. BMC 150 may also be configured to provide out-of-band management facilities for the management of information handling system 105. Such management may be made by BMC 150 even if information handling system 105 is powered off or powered to a standby state.

Resource-constrained device 130 is an example of resource-constrained devices that are increasingly being used in information technology or computing environments. Examples of resource-constrained devices include smart cards, sensors, USB, secure digital (SD) cards, integrated chips, internet of things (IoT) devices, etc. Because of the limited processing and storage capabilities of a resource-constrained device, it may be hard to provide a security solution such as authenticate, provide data integrity/confidentiality, provision, configure, and establish a secure session to ensure secured access to an attached device such as endpoint 140, as these security solutions are typically resource-intensive. In addition, there have been reports of hackers exploiting a vulnerability of a resource-constrained device to take control of a platform or endpoint device associated with the resource-constrained device.

One example of an environment that typically uses a resource-constrained device is a data center. To optimize application data, organizations typically prefer to separate operating system drives from data drives. Such organizations include ones that implement hyper-converged infrastructure (HCI) and software-defined storage (SDS) systems which generally require a hardware redundant array of independent disks (RAID) mirror for the operating systems drive. In the aforementioned systems, a resource-constrained device such as a resource-constrained device 130 is typically used in segregating the operating system boot drives from the data drives or storage devices on server-internal storage. For example, resource-constrained device 130 may be a Dell® PowerEdge Boot Optimized Storage Solution (BOSS) that provides a separate hardware RAID (HWRAID) functionality for the operating system drives while also freeing up additional drive slots to be used for storage devices or "data set" drives such as endpoint device 140. Similar to BOSS, other resource-constrained devices are device controllers that may manage or monitor one or more endpoint devices.

In one embodiment, because of the limited computing capabilities of a resource-constrained device, the present disclosure provides a lightweight delegated authentication and authorization framework for the resource-constrained device 130. The lightweight delegated or proxy authentication and authorization framework includes proxy certificate such as an X.509 proxy certificate among other security certificates that may be used in the resource-constrained environment, such as depicted in system 100. The use of the proxy certificate allows dynamic delegation of authentication privileges to authenticate and verify the trust of one or more endpoints or attached devices. Delegation allows the resource-constrained device 130, to grant one or more of its privileges to a device or component to perform some action on its behalf. The delegation may include calling on other services to enforce one or more trust control policies, such as trust policy 120 and trust policy 160. For example, resource-constrained device 130 may grant a temporary privilege to system BIOS 110 and/or BMC 150 to perform a performing security-related action on the endpoint device 140 according to trust policy 120 or trust policy 160 respectively. The delegation may include one or more requirements such as providing a time constraint on the granting of the privilege.

Resource-constrained device 130 may delegate security actions to system BIOS 110 and/or BMC 150 such as to perform authentication and/or authorization actions on endpoint device 140 on its behalf. For example, system BIOS 110 and BMC 150 may be provided temporary authentication privileges to provision security keys on endpoint device 140 after verifying its identity at power-on by system BIOS 110 or by BMC 150 at runtime. A proxy certificate is generated and issued to system BIOS 110 or BMC 150 for one-time use to establish a session with endpoint device 140 for configuring sensitive information or performing security operations or other operations such as secure input/output (I/O) according to a trust policy.

Trust policies 120 and 160 are context-based security certificate policies for resource-constrained environments. For example, trust policies 120 and 160 may determine whether a certificate of an endpoint device is valid for its designated use. The trust policies may also provide authentication, authorization, and/or other security actions such as encrypting the payload during I/O operation. The security action may be performed against endpoint device 140 on behalf of resource-constrained device 130 while system BIOS 110 and/or BMC 150 are communicating and/or performing other operations such as security operations with other devices and/or components of information handling system 105.

An example of a proxy certificate generated by system BIOS 110 is shown below:

```
System BIOS Proxy Policy - Certificate V3 Extensions
   X509v3 extensions:
      X509v3 Basic Constraints:
         CA: FALSE
      X509v3 Authority Key Identifier:
         DirName:/CN=BIOS_Proxy/ST=KA/C=IN/emailAddress=support
         @BIOSProxy/0=DellEMC/OU=R&D
         Serial:60:2A:0F:87:17:DA:74:A1:6A:E3:D2:BE:A9:B0:46:CE:
         E:3D:18:53:AF
      Proxy Certificate Information: critical
         Path Length Constraint: 00
         Policy Language: Any language
         Policy Text: #Company A SPDM BIOS Proxy Policy
file: CompanyA_SPDM_BIOS_Proxy_Policy.xml
#CompanyA_SPDM_BIOS_Proxy_Policy
<TrustedDevicePolicy>
   <Device>
      <Algorithm>SHA256</Algorithm>
      <Digest>75145b556687eb83d951acd8680947dbde474</Digest>
      <AllowedOperations>DeviceAuth</AllowedOperations>
   </Device>
</TrustedDevicePolicy>
```

An example of a proxy certificate generated by BMC 150 is shown below:

```
Baseboard Management Controller Proxy Policy - Certificate V3
Extensions
   X509v3 extensions:
      X509v3 Basic Constraints:
         CA: FALSE
      X509v3 Authority Key Identifier:
         DirName:/CN=BMC_Proxy/ST=KA/C=IN/emailAddress=support
         @BMCProxy/0=DellEMC/OU=R&D
         Serial:60:2A:0F:87:17:DA:74:A1:6A:E3:D2:BE:A9:B0:46:CE:
         E:3D:18:53:AF
      Proxy Certificate Information: critical
         Path Length Constraint: 00
         Policy Language: Any language
         Policy Text: #Company A SPDM BMC Proxy Policy
file: CompanyA_SPDM_BMC_Proxy_Policy.xml
#Company A SPDM BMC Proxy Policy
<TrustedDevicePolicy>
   <Device>
      <Algorithm>SHA256</Algorithm>
      <Digest>75145b556687eb83d951acd8680947dbde474</Digest>
```

-continued

```
        <AllowedOperations>DeviceAuth</AllowedOperations>
    </Device>
/TrustedDevicePolicy>
```

The secure session is established between system BIOS 110, resource-constrained device 130, and endpoint device 140 using an attestation and key-exchange protocol such as Diffie-Hellman™ key exchange. The SPDM specification provides message exchange, sequence diagrams, message formats, and other relevant semantics for authentication, firmware measurement, and certificate management. Devices and/or components of information handling system 105 like resource-constrained device 130 and/or endpoint device 140 should pass security enforcement such as criteria set by power-on policy, trust policy 120, and trust policy 160 for a successful boot or runtime process to be completed. If a particular device or component fails the security enforcement, then the boot process or runtime process may fail and/or stopped.

Although, system BIOS 110 and BMC 150 are used as examples of devices delegated with the one or more security actions depicted here, other devices such as PCIe adapters, purpose-built authentication devices, central processing units (CPUs), platform components are attached over Inter-Integrated Circuit (I²C) and more can be used. Also, the policies in system 100 such as the power-on policy, trust policy 120, and trust policy 160 may be stored in a file, a data array, or the like in a system BIOS module, a security module, and/or a storage device.

Figure 2:
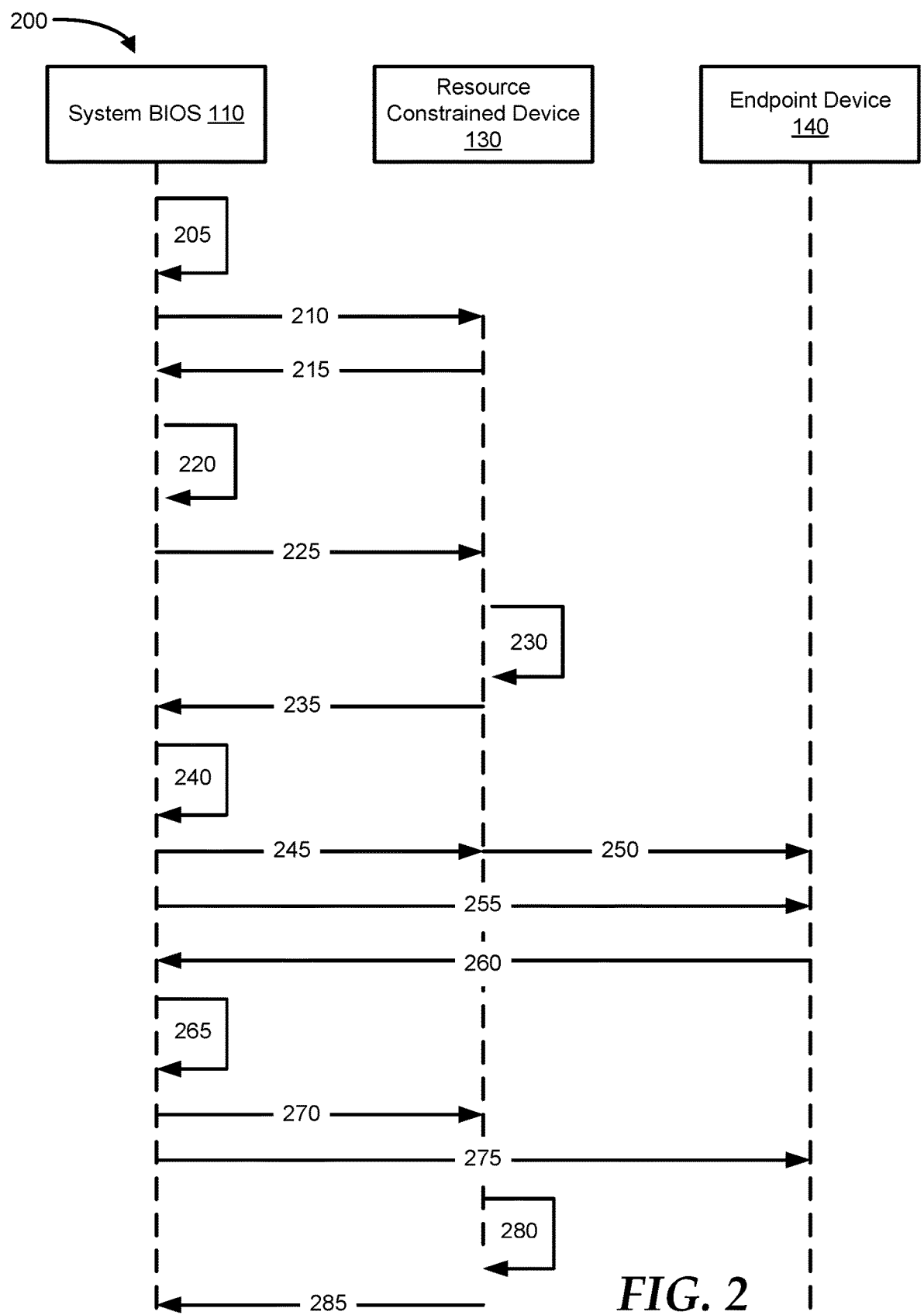
FIG. 2 is a sequence diagram illustrating method for proxy authentication for resource-constrained devices at power-on according to an embodiment of the present disclosure.

FIG. 2 shows a sequence diagram of a method 200 for proxy authentication for a resource-constrained device of system 100. The sequence diagram shows actions shown between a requester such as system BIOS 110 and a responder such as resource-constrained device 130 with an endpoint device 140. Method 200 establishes security trust using proxy certificates for authentication at power on of information handling system 105. While embodiments of the present disclosure are described in terms of system 100 of FIG. 1, it should be recognized that other systems may be utilized to perform the described method. One of skill in the art will appreciate that this sequence diagram explains a typical example, which can be extended to advanced applications or services in practice.

Method 200 typically starts at 205, where system BIOS 110 checks if a security flag associated with resource-constrained device 130 is enabled. If the security flag is enabled, then one or more security actions are to be performed such as establishing a secure session before a transaction associated with an endpoint device is performed. At 210, system BIOS 110 sends a request to get the capabilities, such as the SPDM capabilities of resource-constrained device 130. For example, system BIOS 110 sends a GET_CAPABILITIES request message to resource-constrained device 130. At 215, resource-constrained device 130 sends a response to system BIOS 110. In particular, resource-constrained device 130 may send a CAPABILITIES response message which includes its capabilities such as authentication support, timeout, measurement support, etc. For example, system BIOS 110 determines whether resource-constrained device 130 could support multiple cryptographic hash functions.

At 220, system BIOS 110 checks if the delegate security capability is enabled. At 225, if delegation is enabled, then system BIOS 110 proceeds to send a device authentication request to resource-constrained device 130 to establish trust. If the delegation is not enabled, then the method ends. At 230, resource-constrained device 130 generates an asymmetric key pair which includes a public/private key pair. The generated public/private key pair may be temporary or time-constrained. Resource-constrained device 130 may generate a digital signature using the private key. At 235, resource-constrained device 130 sends a response with the public key to system BIOS 110. System BIOS 110 may verify the digital signature using the public key received.

At 240, system BIOS 110 generates and signs a proxy certificate that it may sign using its private key. The proxy certificate may be an X.509 certificate and includes the public key received from resource-constrained device 130. Since the public key is time-constrained, the proxy certificate may also have a short lifetime. The proxy certificate allows resource-constrained device 130 to delegate some or all of its privileges to system BIOS 110. At 245, system BIOS 110 establishes a secure session with resource-constrained device 130 using the generated proxy certificate. The secure session may be established after authenticating resource-constrained device 130 and/or system BIOS 110. At 250, resource-constrained device 130 establishes a secure session with endpoint device 140 for system BIOS 110 using its private key and the proxy certificate received from system BIOS 110. The resource-constrained device may use the private key to authenticate the proxy certificate. The secure session may be established after authenticating endpoint device 140 and/or resource-constrained device 130. Resource-constrained device 130 may use the proxy certificate to authenticate itself and establish a secure connection with endpoint device 140. The secure connection allows system BIOS 110 to communicate with endpoint device 140.

At 255, system BIOS 110 sends a request for some security information, such as firmware hash, digital certificate, etc. to endpoint device 140 to establish the identity and/or authenticate endpoint device 140. System BIOS 110 may send the request using the secure connection established by resource-constrained device 130. The firmware hash may be the hash value of the image of endpoint device 140. At 260, endpoint device 140 sends a response to system BIOS 110 where the response includes the requested security information. At 265, system BIOS 110 verifies whether endpoint device 140 is authorized to perform a particular transaction. For example, system BIOS 110 may determine whether endpoint device 140 is in a list of allowed devices maintained by an SPDM trust policy, such as trust policy 120, based on the firmware hash of endpoint device 140.

At 270, if endpoint device 140 passes security check(s) such as authentication and/or authorization, then system BIOS 110 enables endpoint device 140 for usage. The usage may be limited to the authorized functions for endpoint device 140. For example, if endpoint device 140 is a storage device, then system BIOS 110 may determine whether endpoint device 140 is authorized for an I/O operation. Otherwise, if endpoint device 140 fails the security check(s), then system BIOS 110 may terminate the secure session and the method ends.

At 275, system BIOS 110 provisions and/or configures endpoint device 140 using the secure session or secure communication channel. System BIOS 110 may also provision a security key, such as a media encryption key, a key-encryption key which may be managed locally or by a server implementing a Secure Enterprise Key Management (SEKM). The security key may be used to encrypt communication between system BIOS 110, resource-constrained device 130, and/or endpoint device 140. The system BIOS 110 and/or resource-constrained device 130 may perform an operation against endpoint device 140. For example, system BIOS 110 may query a set of data from endpoint device 140.

At 280, resource-constrained device 130 may terminate the secure session between system BIOS 110 and endpoint device 140. The resource-constrained device 130 may terminate the secure session after desired actions to be performed such as the provisioning, configuration, and/or operation on endpoint device 140 is done. When the secure session terminates, system BIOS 110, resource-constrained device 130, and/or endpoint device 140 may clean up the secure session secrets such as the proxy certificate, private/public key, etc. Resource-constrained device 130 may track message payloads between system BIOS 110 and endpoint device 140. As such, at 285, resource-constrained device 130 may send a response to system BIOS 110 that indicates the provisioning status of endpoint device 140 such as whether the provisioning and/or configuration of endpoint device 140 is a success or a failure.

Of the above, 210, 215, 245, 250, 255, 260, 270, 275, and 280 may be performed using SPDM over Management Component Transport Protocol (MCTP) binding while 225 and 235 may use Platform Level Data Model (PLDM) over MCTP binding. SPDM is an interface and data model that enables access to low-level security capabilities and operations. MCTP is a protocol designed to support communications between different intelligent hardware components that make up a platform management subsystem. PLDM defines data representations and commands that abstract the platform management hardware. SPDM over MCTP binding defines the format of SPDM messages transported over MCTP communications. PLDM over MCTP binding defines the format of PLDM over MCTP messages.

Figure 3:
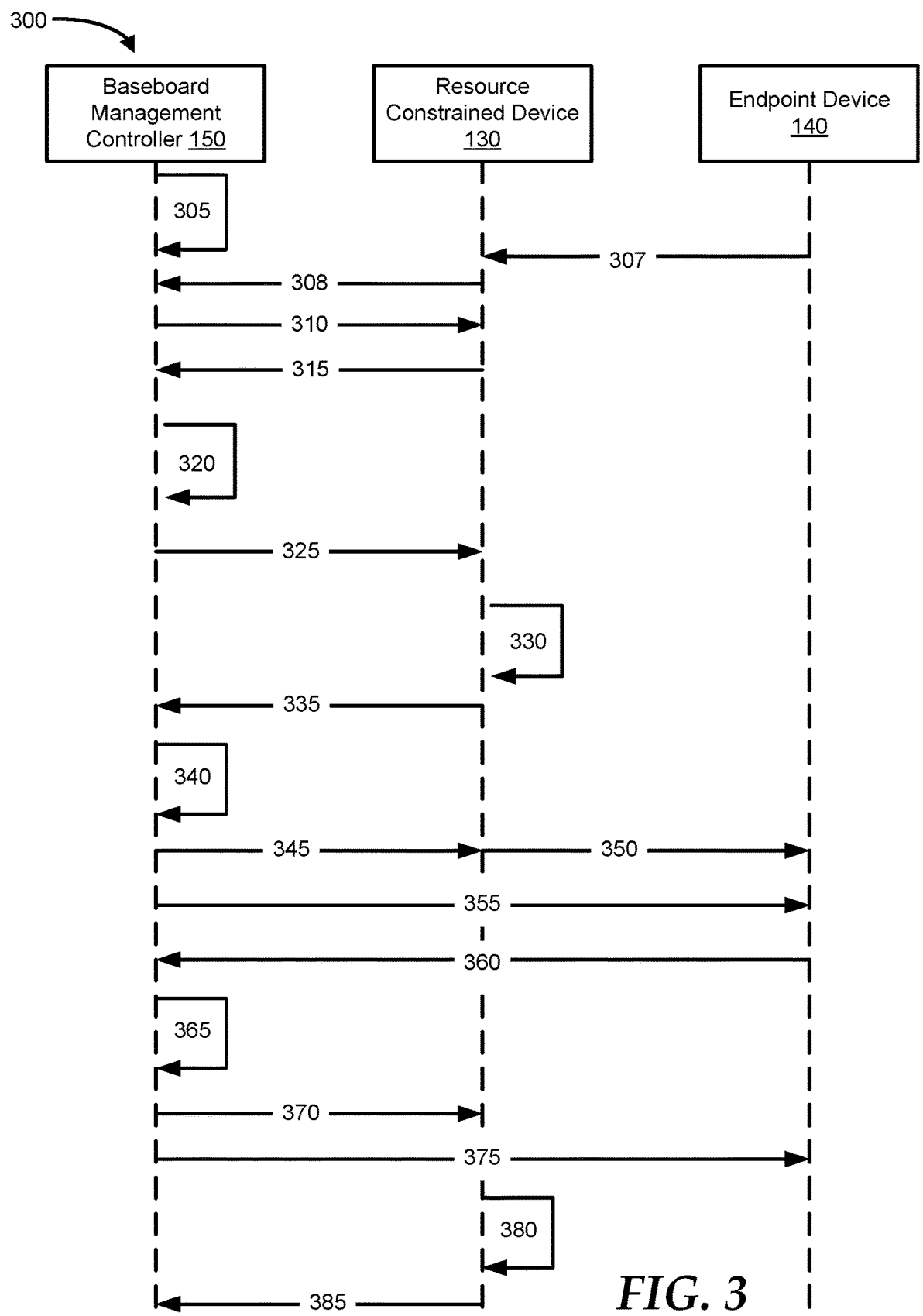
FIG. 3 is a sequence diagram illustrating method for proxy authentication for resource-constrained devices at runtime according to an embodiment of the present disclosure.

FIG. 3 shows a sequence diagram of a method 300 for proxy authentication for a resource-constrained device of system 100 at runtime. The sequence diagram shows actions shown between a requester such as BMC 150 and a responder such as resource-constrained device 130 with an endpoint device 140. Method 300 establishes security trust using proxy certificates for authentication at runtime. While embodiments of the present disclosure are described in terms of system 100 of FIG. 1, it should be recognized that other systems may be utilized to perform the described method. One of skill in the art will appreciate that this sequence diagram explains a typical example, which can be extended to advanced applications or services in practice.

Method 300 typically starts at 305, where BMC 150 checks if a security flag associated with resource-constrained device 130 is enabled. If the security flag is enabled, then one or more security actions are to be performed such as establishing a secure session before a transaction associated with an endpoint device is performed. At 307, a hot-plug operation may be performed, wherein endpoint device 140 which is a hot-plug device is inserted at information handling system 105 and detected by resource-constrained device 130. At 308, resource-constrained device 130 sends a notification to BMC 150 regarding the hot-plug insertion of endpoint device 140. At 310, BMC 150 sends a request to get the SPDM capabilities of resource-constrained device 130. For example, BMC 150 sends a GET_CAPABILITIES request message to resource-constrained device 130. At 315, resource-constrained device 130 sends a response to system BIOS 110. In particular, resource-constrained device 130 sends a CAPABILITIES response message which includes its capabilities such as authentication support, timeout, measurement support, etc. For example, BMC 150 determines whether resource-constrained device 130 could support multiple cryptographic hash functions.

At 320, BMC 150 checks if the delegate security capability is enabled. At 325, if the delegate security capability also referred to as delegation is enabled, then BMC 150 proceeds to send a device authentication request to resource-constrained device 130 to establish trust. If the delegation is not enabled, then the method ends. At 330, resource-constrained device 130 generates asymmetric key pair which includes a public/private key pair. The generated public/private key pair may be temporary or time-constrained. Resource-constrained device 130 may generate a digital signature using the private key. At 335, resource-constrained device 130 sends a response with the public key to BMC 150. BMC 150 may verify the digital signature using the public key received.

At 340, BMC 150 generates and signs a proxy certificate. BMC 150 generates a proxy certificate that it may sign using its private key. The proxy certificate may be an X.509 certificate and includes the public key received from resource-constrained device 130. Since the public key is time-constrained, the proxy certificate may also have a short lifetime. The proxy certificate allows resource-constrained device 130 to delegate some or all of its privileges to BMC 150. At 345, BMC 150 establishes a secure session with resource-constrained device 130 using the generated proxy certificate. The secure session may be established after authenticating and/or trusting resource-constrained device 130. At 350, resource-constrained device 130 establishes a secure session with endpoint device 140 for BMC 150 using its private key and the proxy certificate received from BMC 150. The resource-constrained device may use the private key to authenticate the proxy certificate. The secure session may be established after authenticating endpoint device 140. Resource-constrained device 130 may use the proxy certificate to authenticate itself and establish a secure connection with endpoint device 140. The secure connection allows BMC 150 to communicate with endpoint device 140.

At 355, BMC 150 sends a request for some security information, such as firmware hash, digital certificate, etc. to endpoint device 140 to establish the identity and/or authenticate endpoint device 140. BMC 150 may send the request using the secure connection established by resource-constrained device 130. The firmware hash may be the hash value of the image of endpoint device 140. At 360, endpoint device 140 sends a response to BMC 150 where the response includes the requested security information. At 365, BMC 150 verifies whether endpoint device 140 is authorized. For example, BMC 150 may determine whether endpoint device 140 is in a list of allowed devices maintained by the SPDM trust policy, such as trust policy 160, based on the firmware hash of endpoint device 140.

At 370, if endpoint device 140 passes security check(s) such as authentication and/or authorization, then BMC 150 enables endpoint device 140 for usage. The usage may be limited to the authorized functions for endpoint device 140. For example, if endpoint device 140 is a storage device, then endpoint device 140 may be authorized to perform an I/O operation. Otherwise, if endpoint device 140 fails the security check(s), then BMC 150 may terminate the secure session and the method ends.

At 375, BMC 150 provisions and/or configures endpoint device 140 using a secure communication channel. BMC 150 may also provision a key, such as a media encryption key, a key-encryption key which may be managed locally or by a server implementing an SEKM. The key may be used to encrypt communication between BMC 150, resource-constrained device 130 and/or endpoint device 140. The BMC 150 and/or resource-constrained device 130 may perform an operation against endpoint device 140. For example, BMC 150 may query a set of data from endpoint device 140.

At 380, resource-constrained device 130 may terminate the secure session between BMC 150 and endpoint device 140. The resource-constrained device 130 may terminate the secure after performing the provisioning and/or operation. When the secure session terminates, BMC 150, resource-constrained device 130, and/or endpoint device 140 may clean up the secure session secrets such as the proxy certificate, private/public key, etc. Resource-constrained device 130 may track message payloads between BMC 150 and endpoint device 140. As such, at 285, resource-constrained device 130 may send a response to BMC 150 that indicates whether the provisioning and/or configuration of endpoint device 140 are successful or has failed. Of the above, 310, 315, 345, 350, 355, 360, 370, 375, and 380 may use SPDM over MCTP binding while 325 and 335 may use PLDM over MCTP binding.

Although FIG. 2 and FIG. 3 show example blocks of method 200 and method 300 in some implementation, method 200 and method 300 may include additional blocks, fewer blocks, different blocks, or differently arranged blocks than those depicted in FIG. 2 and FIG. 3. Those skilled in the art will understand that the principles presented herein may be implemented in any suitably arranged processing system. Additionally, or alternatively, two or more of the blocks of method 200 and method 300 may be performed in parallel. For example, block 280 and block 285 of method 200 may be performed in parallel.

FIG. 4 illustrates an embodiment of an information handling system 400 including processors 402 and 404, a chipset 410, a memory 420, a graphics adapter 430 connected to a video display 434, a non-volatile RAM (NV-RAM) 440 that includes a BIOS/extensible firmware interface (BIOS/EFI) module 442, a disk controller 450, a hard disk drive (HDD) 454, an optical disk drive 456, a disk emulator 460 connected to a solid-state drive (SSD) 464, an I/O interface 470 connected to an add-on resource 474 and a trusted platform module (TPM) 476, a network interface 480, and a BMC 490. Processor 402 is connected to chipset 410 via processor interface 406, and processor 404 is connected to the chipset via processor interface 408. In a particular embodiment, processors 402 and 404 are connected together via a high-capacity coherent fabric, such as a HyperTransport link, a QuickPath Interconnect, or the like. Chipset 410 represents an integrated circuit or group of integrated circuits that manage the data flow between processors 402 and 404 and the other elements of information handling system 400. In a particular embodiment, chipset 410 represents a pair of integrated circuits, such as a northbridge component and a southbridge component. In another embodiment, some or all of the functions and features of chipset 410 are integrated with one or more of processors 402 and 404.

Memory 420 is connected to chipset 410 via a memory interface 422. An example of memory interface 422 includes a Double Data Rate (DDR) memory channel and memory 420 represents one or more DDR Dual In-Line Memory Modules (DIMMs). In a particular embodiment, memory interface 422 represents two or more DDR channels. In another embodiment, one or more of processors 402 and 404 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 420 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 430 is connected to chipset 410 via a graphics interface 432 and provides a video display output 436 to a video display 434. An example of a graphics interface 432 includes a PCIe interface and graphics adapter 430 can include a four-lane (x4) PCIe adapter, an eight-lane (x8) PCIe adapter, a 16-lane (x16) PCIe adapter, or another configuration, as needed or desired. In a particular embodiment, graphics adapter 430 is provided down on a system printed circuit board (PCB). Video display output 436 can include a Digital Video Interface (DVI), a High-Definition Multimedia Interface (HDMI), a DisplayPort interface, or the like, and video display 434 can include a monitor, a smart television, an embedded display such as a laptop computer display, or the like.

NV-RAM 440, disk controller 450, and I/O interface 470 are connected to chipset 410 via an I/O channel 412. An example of I/O channel 412 includes one or more point-to-point PCIe links between chipset 410 and each of NV-RAM 440, disk controller 450, and I/O interface 470. Chipset 410 can also include one or more other I/O interfaces, including a PCIe interface, an Industry Standard Architecture (ISA) interface, a Small Computer Serial Interface (SCSI) interface, an I$^2$C interface, a System Packet Interface (SPI), a USB, another interface, or a combination thereof. NV-RAM 440 includes BIOS/EFI module 442 that stores machine-executable code (BIOS/EFI code) that operates to detect the resources of information handling system 400, to provide drivers for the resources, to initialize the resources, and to provide common access mechanisms for the resources. The functions and features of BIOS/EFI module 442 will be further described below.

Disk controller 450 includes a disk interface 452 that connects the disc controller to a hard disk drive (HDD) 454, to an optical disk drive (ODD) 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an institute of electrical and electronics engineers (IEEE) 1394 (Firewire) interface, a proprietary interface, or a combination thereof. Alternatively, SSD 464 can be disposed within information handling system 400.

I/O interface 470 includes a peripheral interface 472 that connects the I/O interface to add-on resource 474, to TPM 476, and to network interface 480. Peripheral interface 472 can be the same type of interface as I/O channel 412 or can be a different type of interface. As such, I/O interface 470 extends the capacity of I/O channel 412 when peripheral interface 472 and the I/O channel are of the same type, and the I/O interface translates information from a format suitable to the I/O channel to a format suitable to the peripheral interface 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on a separate circuit board or add-in card disposed within information handling system 400, a device that is external to the information handling system, or a combination thereof.

Network interface 480 represents a network communication device disposed within information handling system 400, on a main circuit board of the information handling system, integrated onto another component such as chipset 410, in another suitable location, or a combination thereof. Network interface 480 includes a network channel 482 that provides an interface to devices that are external to information handling system 400. In a particular embodiment, network channel 482 is of a different type than peripheral interface 472, and network interface 480 translates information from a format suitable to the peripheral channel to a format suitable to external devices.

In a particular embodiment, network interface 480 includes a NIC or host bus adapter (HBA), and an example of network channel 482 includes an InfiniBand channel, a Fibre Channel, a Gigabit Ethernet channel, a proprietary channel architecture, or a combination thereof. In another embodiment, network interface 480 includes a wireless communication interface, and network channel 482 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 482 can be connected to an external network resource (not illustrated). The network resource can include another information handling system, a data storage system, another network, a grid management system, another suitable resource, or a combination thereof.

BMC 490 is connected to multiple elements of information handling system 400 via one or more management interface 492 to provide out-of-band monitoring, maintenance, and control of the elements of the information handling system. As such, BMC 490 represents a processing device different from processor 402 and processor 404, which provides various management functions for information handling system 400. For example, BMC 490 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 490 can vary considerably based on the type of information handling system. BMC 490 can operate in accordance with an Intelligent Platform Management Interface (IPMI). Examples of BMC 490 include an Integrated Dell® Remote Access Controller (iDRAC).

Management interface 492 represents one or more out-of-band communication interfaces between BMC 490 and the elements of information handling system 400, and can include an I²C bus, a System Management Bus (SMBUS), a Power Management Bus (PMBUS), a Low Pin Count (LPC) interface, a serial bus such as a USB or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 400, that is apart from the execution of code by processors 402 and 404 and procedures that are implemented on the information handling system in response to the executed code.

BMC 490 operates to monitor and maintain system firmware, such as code stored in BIOS/EFI module 442, option ROMs for graphics adapter 430, disk controller 450, add-on resource 474, network interface 480, or other elements of information handling system 400, as needed or desired. In particular, BMC 490 includes a network interface 494 that can be connected to a remote management system to receive firmware updates, as needed or desired. Here, BMC 490 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 490 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 490, an interface defined by the Distributed Management Taskforce (DMTF) (such as a Web Services Management (WSMan) interface, a MCTP or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 490 is included on a main circuit board (such as a baseboard, a motherboard, or any combination thereof) of information handling system 400 or is integrated onto another element of the information handling system such as chipset 410, or another suitable element, as needed or desired. As such, BMC 490 can be part of an integrated circuit or a chipset within information handling system 400. An example of BMC 490 includes an iDRAC or the like. BMC 490 may operate on a separate power plane from other resources in information handling system 400. Thus BMC 490 can communicate with the management system via network interface 494 while the resources of information handling system 400 are powered off. Here, information can be sent from the management system to BMC 490 and the information can be stored in a RAM or NV-RAM associated with the BMC. Information stored in the RAM may be lost after power-down of the power plane for BMC 490, while information stored in the NV-RAM may be saved through a power-down/power-up cycle of the power plane for the BMC.

Information handling system 400 can include additional components and additional busses, not shown for clarity. For example, information handling system 400 can include multiple processor cores, audio devices, and the like. While a particular arrangement of bus technologies and interconnections is illustrated for the purpose of example, one of skill will appreciate that the techniques disclosed herein are applicable to other system architectures. Information handling system 400 can include multiple CPUs and redundant bus controllers. One or more components can be integrated together. Information handling system 400 can include additional buses and bus protocols, for example, I²C and the like. Additional components of information handling system 400 can include one or more storage devices that can store machine-executable code, one or more communications ports for communicating with external devices, and various input and output (I/O) devices, such as a keyboard, a mouse, and a video display.

For purpose of this disclosure information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 400 can include processing resources for executing machine-executable code, such as processor 402, a programmable logic array (PLA), an embedded device such as a System-on-a-Chip (SoC), or other control logic hardware. Information handling system 400 can also include one or more computer-readable media for storing machine-executable code, such as software or data.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium.

A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
    delegating, by a resource-constrained device, a privilege to a basic input/output system, wherein the privilege allows the basic input/output system to authenticate an endpoint device on behalf of the resource-constrained device;
    generating an asymmetric security key that includes a private key and a public key;
    transmitting the public key to the basic input/output system, wherein the public key is included in a proxy certificate generated by the basic input/output system; and
    establishing a secure session between the basic input/output system and the endpoint device using the private key and the proxy certificate, wherein the secure session is used by the basic input/output system to authenticate and verify that the endpoint device is authorized to perform an operation.

2. The method of claim 1, wherein the privilege is a temporary privilege.

3. The method of claim 1, wherein the privilege includes provisioning the endpoint device.

4. The method of claim 1, further comprising using the private key to authenticate the proxy certificate.

5. The method of claim 1, further comprising terminating the secure session.

6. The method of claim 1, wherein the delegating the privilege to the basic input/output system is performed at power-on.

7. The method of claim 1, further comprising sending a response that includes a provisioning status of the endpoint device.

8. An information handling system, comprising:
    a requester configured to:
        determine if delegation is enabled in a resource-constrained device;
        generate a proxy certificate; and
        authenticate and verify whether an endpoint device is authorized; and
    the resource-constrained device configured to:
        delegate a privilege to the requester, wherein the privilege allows the requester to authenticate the endpoint device on behalf of the resource-constrained device;
        generate an asymmetric security key that includes a private key and a public key;
        transmit the public key to the request, wherein the public key is included in the proxy certificate; and establish a secure session between the requester and the endpoint device using the private key and the proxy certificate, wherein the secure session is used by the requester to authenticate and verify that the endpoint device is authorized.

9. The information handling system of claim 8, wherein the requester is a basic input/output system.

10. The information handling system of claim 8, wherein the requester is a baseboard management controller.

11. The information handling system of claim 8, wherein the requester is further configured to determine whether a firmware hash of the endpoint device is authorized based on a trust policy.

12. The information handling system of claim 8, wherein the requester is further configured to provision and configure the endpoint device.

13. The information handling system of claim 8, wherein the requester is further configured to determine whether a security flag of the resource-constrained device is enabled.

14. A method comprising:
delegating, by a resource-constrained device, a privilege to a baseboard management controller, wherein the privilege allows the baseboard management controller to authenticate and verify an endpoint device on behalf of the resource-constrained device;
generating an asymmetric security key that includes a private key and public key;
transmitting the public key to the baseboard management controller, wherein the public key is included in a proxy certificate generated by the baseboard management controller; and
establishing a secure session between the baseboard management controller and the endpoint device, wherein the secure session is used by the baseboard management controller to authenticate and provision the endpoint device.

15. The method of claim 14, wherein the privilege is a temporary privilege.

16. The method of claim 14, wherein the privilege includes provisioning the endpoint device.

17. The method of claim 14, further comprising using the private key to authenticate the proxy certificate.

18. The method of claim 14, further comprising terminating the secure session.

19. The method of claim 14, wherein the delegating the privilege to the baseboard management controller is performed at runtime.

20. The method of claim 14, further comprising sending a response that includes a provisioning status of the endpoint device.

\* \* \* \* \*